United States Patent [19]

Koch et al.

[11] Patent Number: 4,715,030

[45] Date of Patent: Dec. 22, 1987

[54] LOCAL AREA NETWORK BRIDGE

[75] Inventors: Steven R. Koch, Seabrook, Md.; Charles R. Stein, Schenectady, N.Y.; William T. Hatfield, Schenectady, N.Y.; Neil R. Shapiro, Schenectady, N.Y.; William C. Hughes, Scotia, N.Y.

[73] Assignee: General Electric Company, Schenectady, N.Y.

[21] Appl. No.: 892,618

[22] Filed: Aug. 4, 1986

[51] Int. Cl.[4] .............................................. H01J 3/02
[52] U.S. Cl. ..................................... 370/85; 340/825.5
[58] Field of Search ............................... 370/85, 88, 89; 340/825.5, 825.52

[56] References Cited

U.S. PATENT DOCUMENTS

| | | | |
|---|---|---|---|
| 4,535,448 | 8/1985 | Baxter et al. | 370/85 |
| 4,623,997 | 11/1986 | Tulpule | 370/85 |
| 4,627,052 | 12/1986 | Hoare et al. | 370/85 |

OTHER PUBLICATIONS

"An Introduction to Local Area Networks" by D. Clark et al., Proceedings of the IEEE, vol. 66, No. 11, Nov. 1978, pp. 1497-1517.
"Dual-Chip Sets Forge Vital Link for Ethernet Local-Network Scheme" by Hindin, Electronics, Oct. 6, 1982, pp. 89-103.
Intel Microcommunication Handbook, published by Intel Corporation, 1985, Ch. 2, pp. 8-1—8-14.
"Practical Perfect Hashing" by Cormack et al., The Computer Journal, vol. 28, No. 1, 1985, pp. 54-58.

*Primary Examiner*—Michael A. Masinick
*Assistant Examiner*—Frank M. Scutch, III
*Attorney, Agent, or Firm*—Richard V. Burgujian; James C. Davis, Jr.; Paul R. Webb, II

[57] ABSTRACT

Apparatus for bridging between two local area networks is disclosed. The apparatus has two bridge sides each including means for receiving or transmitting a message frame, controller means for directing an incoming message frame into a memory means shared between the bridge sides or directing a frame out of the memory means for transmission, address reading means for reading an address portion of the incoming frame and processor means for determining frame transmissibility from the address portion as provided by the address reading means. The apparatus is configured such that the processor means determines incoming frame transmissibility substantially concurrent with the controller means directing the incoming frame into the memory means.

24 Claims, 9 Drawing Figures

Fig. 4a

LOCAL AREA NETWORK BRIDGE

The invention relates, in general, to apparatus for bridging between two local area communication networks and more specifically to a bridge having a unique architecture enabling fast, protocol independent processing of message frames.

BACKGROUND OF THE INVENTION

Local area networks (LANs) to enable local communication among computing stations and computer related devices are well known in the art. The reference entitled "An Introduction to Local Area Networks" by D. Clark et al., Proceedings of the IEEE, Vol. 66, No. 11, pps. 1497-1517, November 1978, provides a general description of local area networks and their operation and is incorporated in its entirety herein by reference. LANs are implemented using a variety of network topologies and control structures, the control structure determining how the different devices connected to a network achieve access thereto and communicate with one another. Such topologies and control structures are described in the above-cited reference by Clark et al.

One control structure that finds wide use is the carrier-sense multiple-access with collision detection (CSMA/CD) protocol. Examples of this are found in LANs following IEEE 802.3 and the Ethernet (a trademark of Xerox Corporation) specifications for a CSMA/CD network. The CSMA/CD protocol defines LAN operation in the data link layer of the International Standards Organization (ISO) seven protocol layer open system interconnection model. A LAN such as an Ethernet LAN defines the physical (i.e., transmission medium) and data link layers of the ISO seven layer model. One benefit of adopting a standardized LAN for the two lowest protocol layers is that it enables a number of subnetworks to share the same LAN. Such subnetworks can then communicate with each other via the LAN provided they have compatible client protocol layers, i.e., the protocol layers above the data link layer in the ISO model. In the case of a large user, e.g., a large corporation, it often occurs that a number of such LANs are installed, each LAN being primarily intended for interconnecting specific subnetworks of devices having compatible client protocols. Subsequently, a need develops to establish communication between the discrete LANs.

To meet this need and for a variety of other reasons described in the above-cited Clark et al. reference, it may be desirable to interconnect discrete LANs by means of communication bridges. A bridge interconnecting two LANs acts as a filter by transmitting only message frames having a destination address of a device located on the far side of the bridge. A bridge typically includes two transceivers, each for transmitting message frames to and receiving frames from one of the two LANs the bridge interconnects. Note that while the transceivers are essential components that enable receipt and transmission of message frames, they are not always considered an integral part of a bridge by those skilled in the art. Bridges also include means for interfacing with the respective control structures of the LAN they interconnect as well as means for performing the message frame filtering discussed above.

Thus, the situation is created where bridges are used to interconnect discrete LANs each having devices connected thereto with client protocol layers compatible with other devices on the same LAN but not necessarily compatible with devices on other LANs. Such bridges are typically adapted to be specific to the client layer protocols being used on the LANs. This may be accomplished by applying a separate bridge for each protocol involved or a complex bridge that can handle all of the protocols. A bridge that is independent of the client layer protocols is desirable since such a bridge would be simpler and less expensive to construct and could be applied between LANs independently of the client layer protocols specific thereto.

In large communication systems consisting of multiple LANs and bridges, the total number of communicating devices can be substantial with many of these devices communicating with many other devices on the system irrespective of the device locations. As a result, each bridge interconnecting its two proximate LANs also receives message frames from devices connected to LANs other than the proximate LANs, the frames being intended for yet other LANs. Thus, it is a desirable feature of such a bridge to have a capacity to handle a large number of message frames in as short a time period as possible so that the bridge does not become a communication bottleneck, i.e., a large bandwidth is desirable.

Client layer protocols sometimes require a receiving device to acknowledge to the sending device that a message frame has been received. Typically, a relatively short time period is allocated by the sending device within which to receive the acknowledgement. Where acknowledgement is not received within this time period, the sending device assumes the message frame transmission failed and a retransmission may be attempted. In consideration of such client layer protocols, bridge operation must be fast enough so as to not introduce a delay resulting in an apparent transmission failure.

OBJECTS OF THE INVENTION

It is a principal object of the present invention to provide a new and improved LAN bridge which is not subject to the aforementioned problems and disadvantages.

Another object of the present invention is to provide a LAN bridge that operates independently of client level protocols.

A further object of the present invention is to provide a LAN bridge that operates with a high bandwidth.

An additional object of the present invention is to provide a LAN bridge that minimizes store and forward delay so as not to cause apparent transmission failures with respect to client layer protocols.

SUMMARY OF THE INVENTION

The foregoing objects are accomplished by the present invention which is directed to a LAN bridge, for interconnecting two LANs, having a unique architecture that enables a high bandwidth and a high operating speed. The bridge is divided into two sides each having means for receiving or transmitting a message frame, a LAN controller, and a processor. A memory for storing message frames is shared between the LAN controllers on the respective bridge sides. Each processor has associated therewith means for reading an address portion of an incoming message frame. Upon one bridge side receiving a message frame from the LAN connected thereto, the LAN controller on the receiving bridge side stores the frame in a predetermined location in the memory. Substantially simultaneously the address reading means on the receiving bridge side reads the frame address portion and provides only this information to the processor on the same bridge side. The processor then determines whether the frame is to be transmitted through the bridge. Upon completing storing the frame in the memory, the LAN controller signals the processor that a frame has been received and the predetermined location in the memory where it is stored. If the processor has determined the frame is to be transmitted, it signals the processor on the other, transmitting bridge side that the frame stored at the predetermined address in the memory is transmissible. The transmitting bridge side processor commands the LAN controller on its bridge side to transmit the frame stored at the predetermined address. That LAN controller directs the message frame from the memory to the frame transmitting means on the transmitting bridge side.

Thus in operation the processor determines frame transmissibility while the frame is being stored, which serves to increase the operating speed of the bridge. Further, the frame is stored only once before being retransmitted which further serves to increase bridge operating speed.

These and other objects of the invention, together with the features and advantages thereof, will become apparent from the following detailed description when read together with the accompanying drawings in which applicable reference designations have been carried forward.

BRIEF DESCRIPTION OF THE DRAWINGS

FIG. 4, consisting of FIGS. 4a and 4b, is a block diagram illustrating one aspect of the operation of the present invention;

FIG. 7, consisting of FIGS. 7a and 7b, is a diagram illustrating an additional memory structure used in a preferred embodiment of the present invention.

DESCRIPTION OF THE INVENTION

Figure 1:
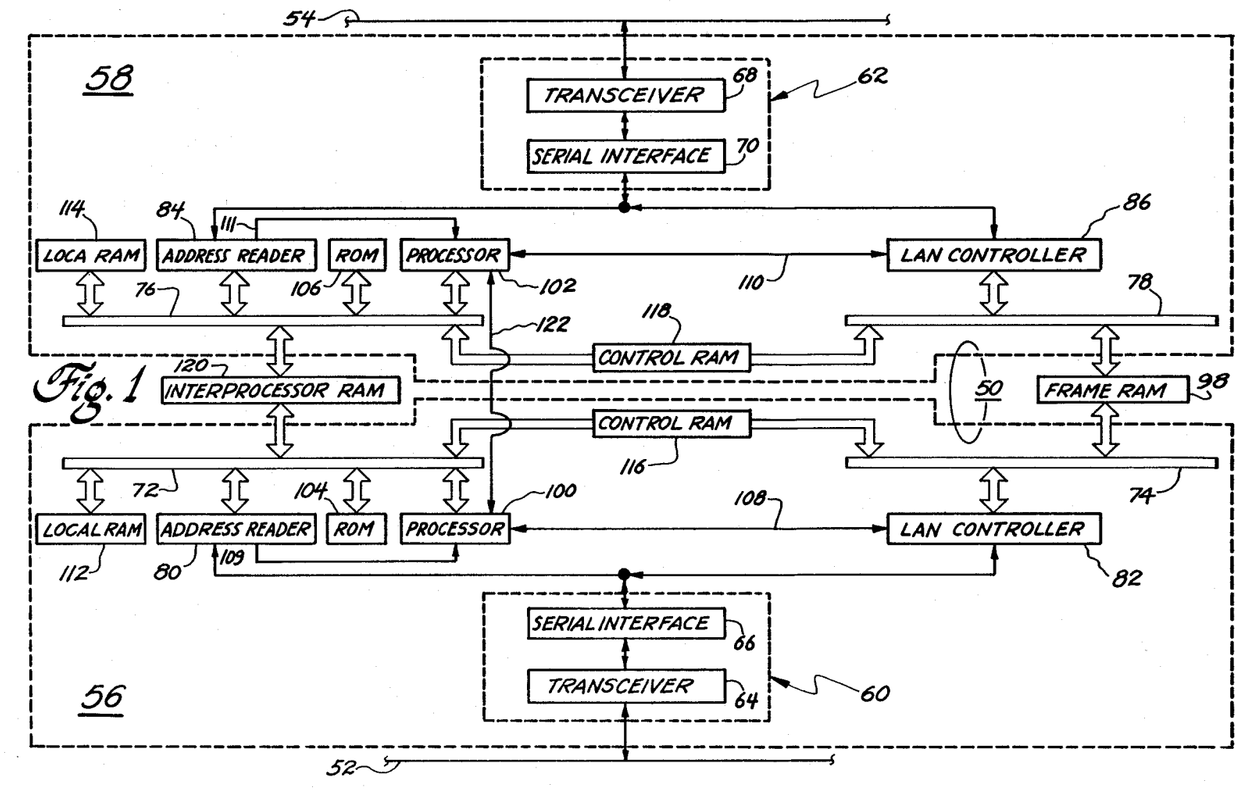
FIG. 1 is a schematic illustration of the bridge of the present invention.

Referring now to the drawings, FIG. 1 illustrates a bridge 50, constructed in accordance with the present invention, interconnecting two local area communication networks (LANs) 52 and 54. LANs 52 and 54 are preferably of the same type, for example, an Ethernet (a trademark of Xerox Corp.) LAN. In order to facilitate the description of bridge 50, it is convenient to view the bridge as partitioned into two bridge sides 56 and 58. The two bridge sides include substantially identical components and the descriptions that follow of such components pertain to their operation on either bridge side. Bridge sides 56 and 58 each include a network interface 60 and 62, respectively, for interfacing with the LAN associated with that bridge side. Network interface 60 includes a transceiver 64 connected to LAN 52 and a serial interface device 66 connected to the transceiver. Network interface 62 similarly includes a transceiver 68 connected to LAN 54 and a serial interface device 70 connected to the transceiver. Each transceiver is of a type well known in the art and is adapted to transmit to or receive from the LAN connected thereto message frames in bit-serial form. In the case of various LAN access control schemes, such as the above-described CSMA/CD scheme used in Ethernet LANs, it is necessary to sense whether a collision has occurred, on the LAN, between a message frame being transmitted by the transceiver and other signals on the LAN. If bridge 50 is applied between LANs using such control schemes, the transceiver includes means for sensing such collisions and for generating a signal indicating a collision has occurred. While transceivers 64 and 68 are indicated as integral elements of bridge 50, it is understood, as discussed above, that they are sometimes considered to be external to the bridge by those skilled in the art. A commercially available transceiver having the above-described features is the Digital Equipment Corporation Ethernet transceiver.

Each serial interface device includes means for decoding received message frames and encoding message frames for transmission such as where the message frames present on the LAN are in Manchester encoded form. Additionally, the serial interface generates a carrier present signal and modifies the collision signal, provided by the transceiver, to be compatible with other bridge circuitry. An example of a commercially available serial interface device which performs these functions is the Intel 82501 Ethernet serial interface chip. The Intel 82501 chip is adapted for use with Ethernet and certain non-Ethernet LANs. The operation of the Intel 82501 chip as well as comparable serial interface devices manufactured by others is described in the reference entitled "Dual-Chip Sets Forge Vital Link for Ethernet Local Area Network Scheme" by H. J. Hindin, Electronics, Oct. 6, 1982, pps. 89-103 which is incorporated in its entirety herein by reference. The nature and operation of the Intel 82501 chip is also described in the Intel Microcommunications Handbook published by Intel Corporation, 1985, pps. 8-1 through 8-14 which are incorporated herein by reference.

Figure 2:
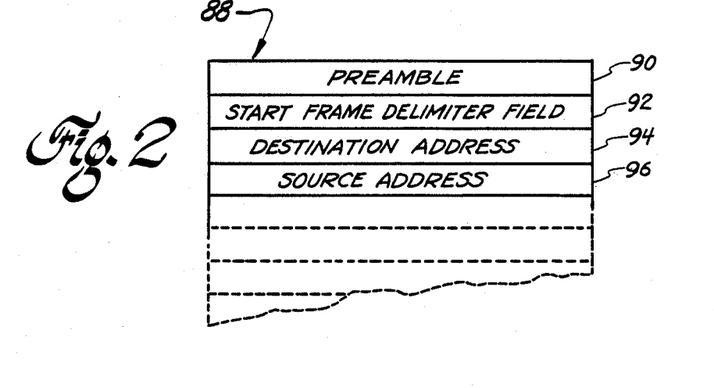
FIG. 2 illustrates a portion of an exemplary message frame.

Bridge side 56 includes two local buses 72 and 74 while bridge side 58 includes local buses 76 and 78. Each local bus enables communication between the devices connected thereto and may include control means (not shown), well known in the art, to arbitrate between devices attempting to gain bus access. Serial interface device 66 of network interface 60 is connected to both an address reader 80 and a LAN controller 82. Similarly, serial interface device 70 of network interface 62 is connected to an address reader 84 and a LAN controller 86. Each address reader includes means for reading and temporarily storing an address portion of an incoming message frame received by the network interface to which it is connected, the address portion consisting of the frame source and destination addresses. Since the format of a message frame is normally predetermined, the address reader needs only to store an initial portion of the frame, the initial portion containing the addresses and having a predetermined word length. For example, in the case of a LAN configured in accordance with IEEE 802.3 (e.g., an Ethernet LAN), the message frame includes fields as illustrated in FIG. 2. A message frame 88 illustrated therein includes a preamble 90 which leads the message frame, followed in sequence by a start frame delimiter field 92, a destination address 94, a source address 96 and the balance of the frame. The destination address is the address of the device to which the message frame is being transmitted, while the source address is that of the device transmitting the message. Thus, while the entire message frame 88 is being received, the address reader only reads and stores addresses 94 and 96. Reading and storing addresses are accomplished with minimum difficulty since the respective bit lengths of preamble 90, field 92 and addresses 94 and 96 are predetermined. The address reader also includes data storage means, preferably in the form of hardware registers, to store the addresses.

Referring again to FIG. 1, LAN controller 82 is connected to bus 74 and LAN controller 86 is connected to bus 78. A dual-port random access memory (RAM) 98, for holding message frames is connected between buses 74 and 78. Each LAN controller includes means for directing an incoming message frame received from the network interface connected thereto, via the local bus to which it is connected, to frame RAM 98. Each LAN controller has direct memory access capability for writing the incoming message frame directly into RAM 98. Additionally, it is preferred that the LAN controller include a FIFO register in which the incoming message frame is first received and then transferred from, into RAM 98. Both the direct memory access capability and FIFO register facilitate minimization of the time required to store the incoming message frame in RAM 98. Each LAN controller also has the capability to direct a previously received message frame, stored in RAM 98, from the RAM to the network interface connected to the LAN controller for transmission onto the proximate LAN. Such a transfer out of RAM 98 is also accomplished by direct memory access and, preferably, a FIFO register in order to facilitate a high speed transfer. One example of a commercially available LAN controller, having the above described capabilities, is an Intel 82586 LAN controller chip. A detailed description of the operation of the 82586 chip is contained in the above-incorporated Hindin reference as well as the Intel Microcommunications Handbook, cited above, in Chapter 2 which is incorporated herein by reference. The operation of the LAN controllers in bridge 50 is more fully described below.

RAM 98 is shared between buses 74 and 78 and is accessible by both LAN controllers 82 and 86. To enable access by both controllers, RAM 98 has a dual-port design and comprises one or more dynamic RAMs and a RAM controller which arbitrates between the two LAN controllers seeking access to the RAM. RAM 98 can be readily constructed, by one skilled in the art, from standard dynamic RAMs and a controller device, such as an Intel 8207 DRAM controller.

Bridge sides 56 and 58 further include processors 100 and 102, respectively. Processor 100 is connected to bus 72 and processor 102 is connected to bus 76. Processor 100 is further connected to LAN controller 82 by a control interconnection 108 and processor 102 is connected to LAN controller 86 via a control interconnection 110. Additionally, processor 100 is connected to address reader 80 by a control interconnection 109 while a control interconnection 111 connects address reader 84 to processor 102. Each address reader after storing the source and destination addresses of the incoming message frame, sends an interrupt signal to its associated processor via the control interconnection therebetween. A read only memory (ROM) 104, connected to bus 72, holds program instructions for execution by processor 100. Similarly, a ROM 106 is connected to bus 76 and holds the program instructions for processor 102. A local RAM 112, connected to bus 72, and a local RAM 114, connected to bus 76, respectively provide memory space for use by processors 100 and 102.

Each processor performs multiple functions including providing commands to the associated LAN controller on the same bridge side and determining whether an incoming message frame received from one LAN should be transmitted to the other LAN. The operation of each processor is more fully described below. An example of a commercially available processor that may be used in bridge 50 is the Intel 80186 microprocessor. The requisite functions of the processor when used with the Intel 82586 chip are fully described in Chapter 2 of the Intel Microcommunications Handbook, incorporated above, wherein the processor is referred to as the "CPU".

Communication between the processor and LAN controller on each bridge side is primarily by means of a dual-port control RAM. Thus, on bridge side 56, processor 100 and LAN controller 82 communicate by means of a dual-port control RAM 116, while on bridge side 58, a dual-port control RAM 118 enables communication between processor 102 and LAN controller 86. Dual-port RAM's 116 and 118 may be constructed as described above with respect to dual-port RAM 98. Generally, two types of communication occur between the processor and its associated LAN controller on a bridge side. First, the processor provides commands to the LAN controller by writing the commands into its associated control RAM in a predetermined area and then generating a controller interrupt signal on the control interconnection between the processor and LAN controller. In response to the controller interrupt signal, the LAN controller reads the commands and executes them. Second, the LAN controller provides status information to the processor by writing that information into the control RAM in another predetermined area and generating a processor interrupt signal on the control interconnection. In response to the processor interrupt signal, the processor reads the status information.

The processors on the two bridge sides have need to communicate with one another in the operation of bridge 50. This interprocessor communication is accomplished by means of an interprocessor dual-port RAM 120 and an interprocessor control connection 122. RAM 120 may be constructed as described above with respect to RAM 98. RAM 120 includes two control message queues, one queue for each processor and two transmit frame queues with one queue for each processor. In order for one processor to send a message to the other processor, the sending processor writes the message in RAM 120 and enqueues a pointer to that message in the appropriate queue of the other, receiving processor. Then, the sending processor generates an interrupt signal on connection 122 the content of which indicates that the receiving processor should poll the queue to which the pointer was added. The receiving processor dequeues the pointer(s) in that queue and reads the message(s), the location of which is indicated by the pointer. For example, if processor 100 is sending a control message to processor 102, processor 100 writes the control message in RAM 120 and enters a pointer to that control message in the control message queue of processor 102. Processor 100 then generates an interrupt signal on connection 122, the content of the interrupt signal indicating that processor 102 should poll its control message queue. Processor 102 dequeues the control message queue and is directed to the control message, in RAM 120, by the pointer.

As discussed above, each LAN controller directs incoming message frames into frame RAM 98. RAM 98 is segmented into a plurality of data buffers to store the incoming message frames, where more than one data buffer may be utilized to store a single frame. The addresses of these data buffers are initially held in a free data buffer queue in RAM 120. Upon initiatng operation of bridge 50, each processor takes a predetermined number of data buffer addresses from the queue and forms a buffer address list in its associated control RAM. The LAN controller accesses that list and uses the buffer addresses to determine the storage locations in RAM 98 for incoming message frames. Subsequently, as message frames are transmitted through the bridge or discarded, in a manner more fully described below, the addresses of the data buffers where those frames were stored are returned to the free data buffer queue. Also, as the list of free data buffer addresses in the control RAM is depleted by the LAN controller, the associated processor periodically takes additional buffer addresses from the free data buffer queue and adds them to the buffer address list in the control RAM.

In operation, it is the basic function of bridge 50 to transmit messages between LAN's 52 and 54 when the source of the message frame, i.e., the device transmitting it, is on one side of the bridge and the destination of the message frame, i.e., the intended receiving device, is on the other side of the bridge. Thus, the bridge needs to know the positions of transmitting and receiving devices relative thereto. To this end, bridge sides 56 and 58 each maintain a source address table consisting of an address list of devices located on the LAN to which the bridge side is connected.

Figure 3:
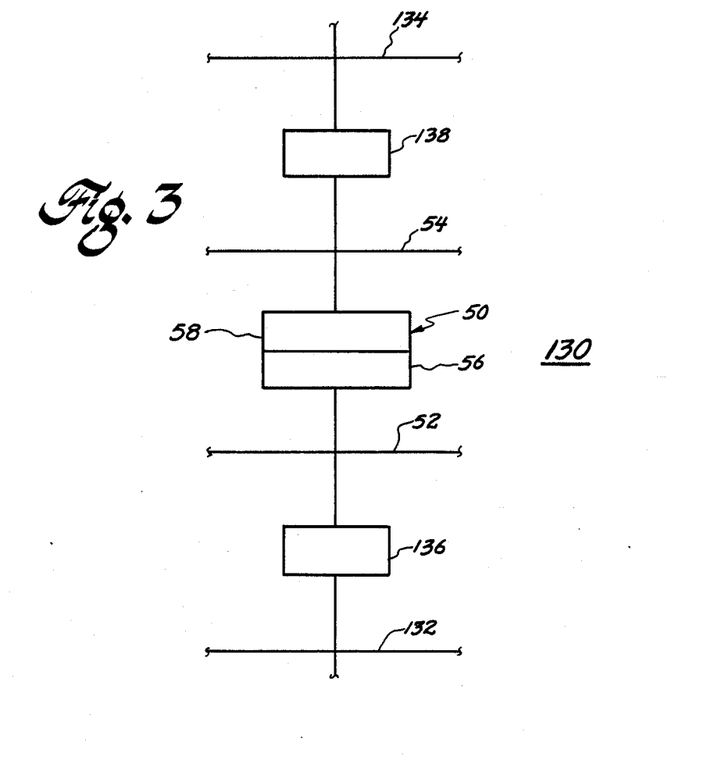
FIG. 3 illustrates an exemplary communication system in which the bridge of the present invention may be used.

Referring to FIG. 3, a communication system 130 may include, in addition to bridge 50 and LANs 52 and 54, additional LANs 132 and 134 respectively connected to LANs 52 and 54 by bridges 136 and 138. Further, as illustrated in FIG. 3, the communication system may extend to additional LANs connected to the LANs shown by additional bridges. In such an extended communication system, each bridge needs to have information pertaining to not only the locations of devices, relative thereto, on the LANs it interconnects but also the relative locations of other devices on other LANs in the system. This is necessary so that a bridge can properly disposition message frames originating from devices on LANs other than the two LANs which the bridge directly interconnects. For example, in system 130, the source address table maintained by bridge side 56 of bridge 50 should contain addresses of devices not only on LAN 52 but also on LAN 132 and LANs connected by bridges beyond LAN 132. Similarly, the bridge side 58 source address table should include devices on LAN 54, LAN 134 and LANs connected beyond LAN 134.

The source address tables of bridge sides 56 and 58 are maintained in local RAMs 112 and 114 respectively. It is preferred that bridge 50 operate in a promiscuous mode whereby both network interfaces 60 and 62 receive all message frames present on LANs 52 and 54 respectively. As previously discussed, each incoming message frame is passed by the network interface of the bridge side receiving the frame to the address reader which reads and stores the frame address portion consisting of the source and destination addresses. The incoming frame addresses are accessed by the receiving bridge side processor, in a manner more fully described below, which determines whether the frame is to be transmitted through the bridge. This determination process may simply consist of the processor looking up the destination address in its source address table (in local RAM) and if that address is or is not found, indicating that the destination device is or is not located in the portion of the communication system on the receiving bridge side, the processor respectively determines the frame is not or is to be transmitted.

Another method by which the processor may determine whether or not to transmit a message frame is disclosed in commonly assigned copending patent application Ser. No. 892,601 incorporated in its entirety herein by reference. The method disclosed therein when practiced by all bridges in the communication system enables the bridges to learn the locations of all devices in the system transmitting and receiving message frames. In order to practice the method, the address reader must read and store both the source and destination addresses of the incoming message frame.

Figure 4A:
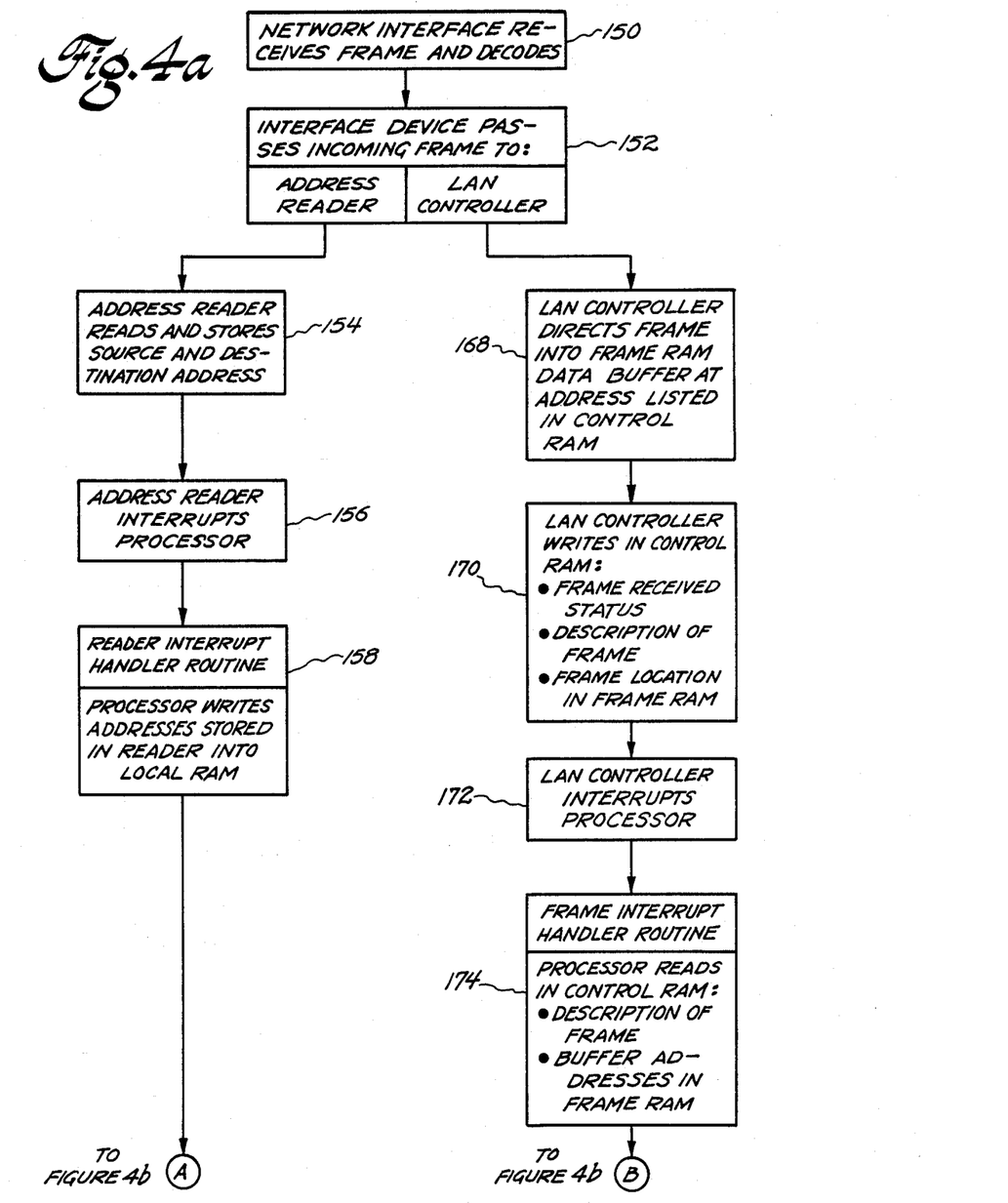
Figure 4B:
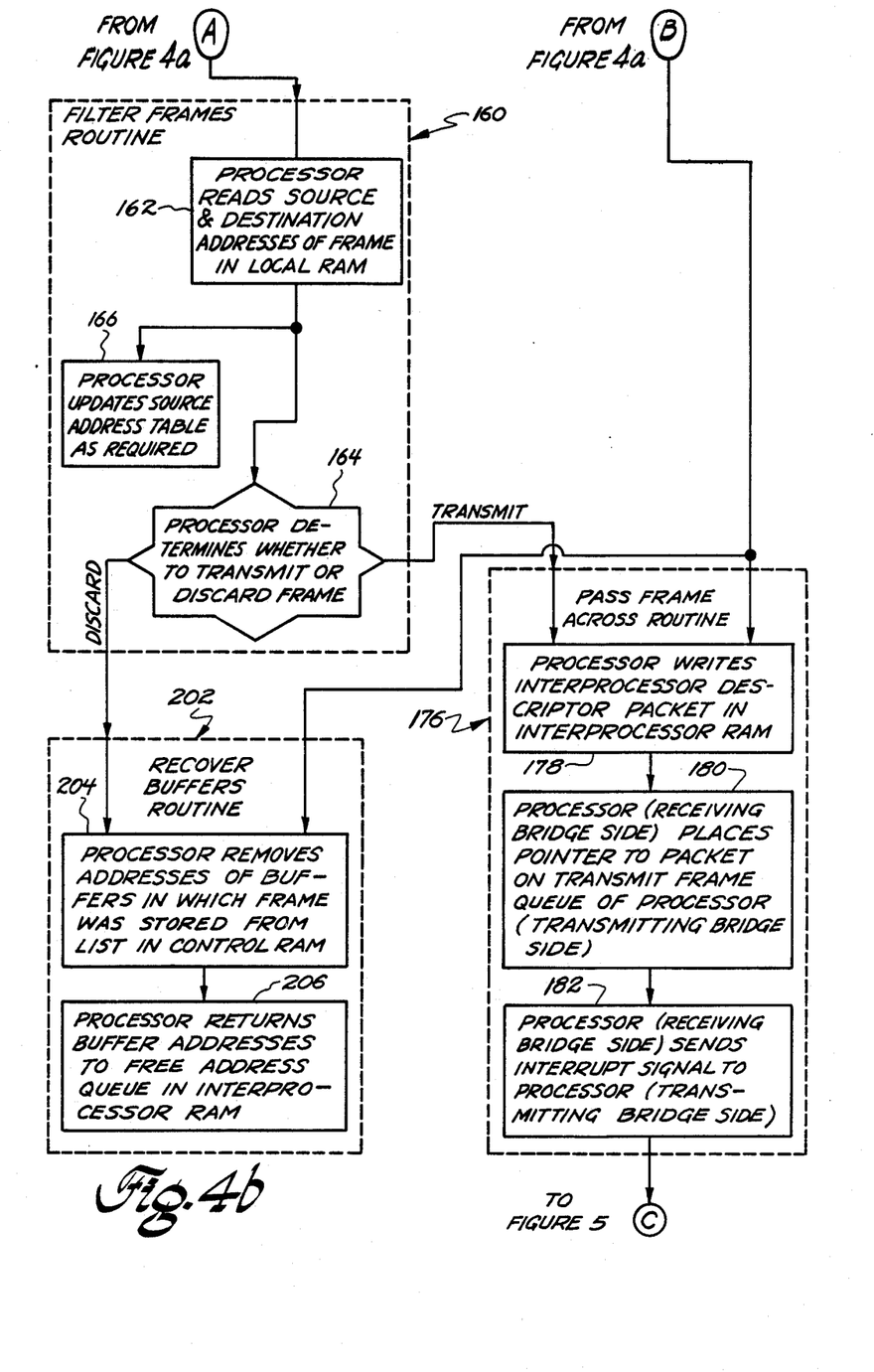
Figure 5:
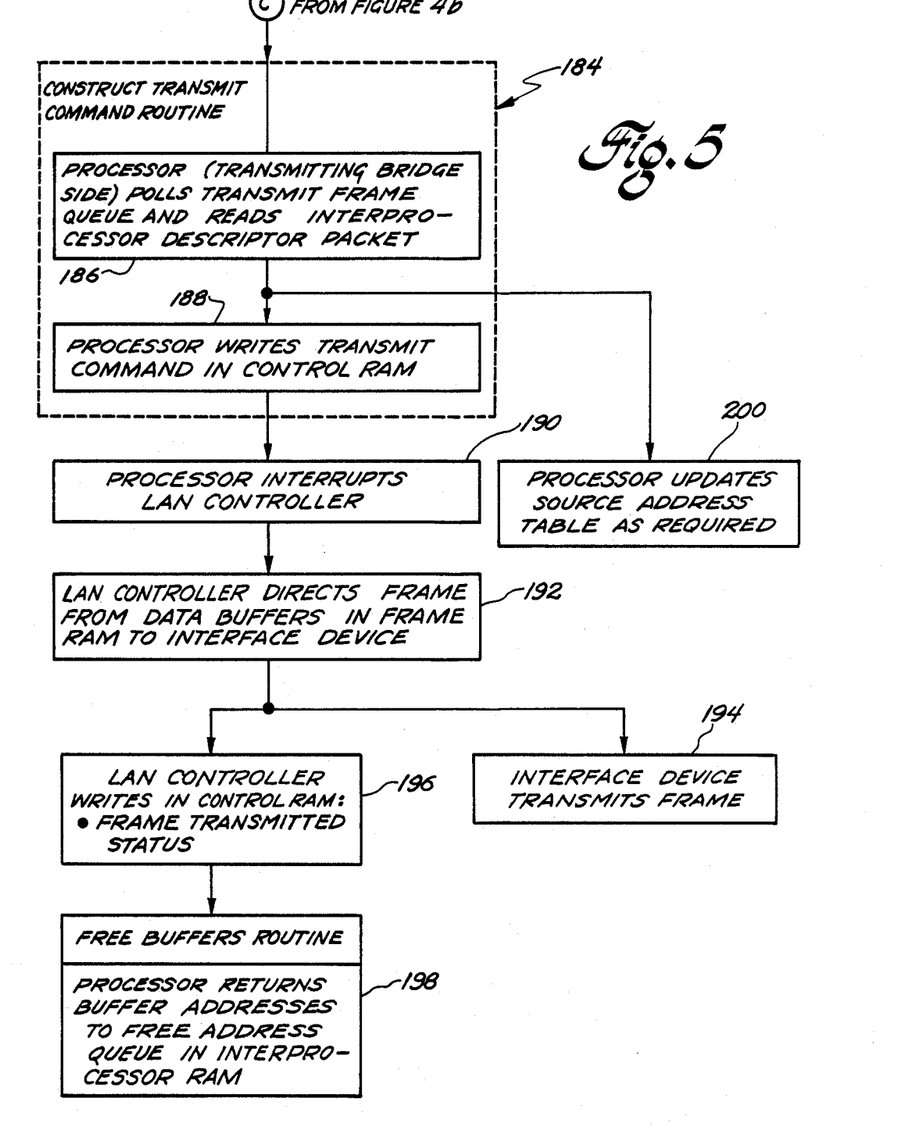
FIG. 5 is a block diagram illustrating an additional aspect of the operation of the present invention.

The operation of bridge 50 is illustrated in FIGS. 4 and 5. The operations illustrated in FIG. 4 occur on the bridge side receiving the incoming message frame, while FIG. 5 illustrates operations occurring on the other bridge side which transmits the received frame. Referring first to FIG. 4, bridge operation commences at block 150 with an incoming message frame being received by the network interface on one bridge side, hereinafter referred to as the receiving bridge side. After the transceiver therein receives the incoming message frame, the serial interface device decodes it and, at block 152 passes the received frame to both the address reader and the LAN controller on the receiving bridge side. At block 154, the address reader reads the source and destination addresses of the message frame, temporarily stores them, and then, at block 156, sends an interrupt signal to the receiving bridge side processor via the control interconnection between the address reader and processor. In response to the interrupt, the processor executes a reader interrupt handler routine, at block 158, and transfers the source and destination addresses out of the address reader and writes the addresses into its local RAM. Next, at block 160, the processor executes a filter frames routine. As part of this routine, the processor reads the source and destination addresses in the local RAM, at block 162. The processor uses the frame address information and the contents of the source address table it maintains in the local RAM to determine, at block 164, whether the message frame is to be transmitted or discarded. If the method disclosed in the above-referenced 892,601 application is practiced, the processor uses both the source and destination addresses in the determination and, at block 166, updates its source address table on the basis of the frame source address.

As part of the operation at block 164, the processor determines, at least, whether the received frame destination address is included in the source address table, and in the practice of the method disclosed in the above-referenced Ser. No. 892,601 application, the processor also determines whether the source address is included in the table. In order to enhance the operating speed of bridge 50, it is preferred herein that the processor use any one of a number of hashing techniques, well known in the art, suitable for accomplishing this determination in as little time as possible. One such suitable technique is described in the paper entitled "Practical Perfect Hashing" by G. V. Cormack et al., The Computer Journal, Vol. 28, No. 1, 1985, pp. 54-58, which is incorporated herein by reference.

While the operations in blocks 154, 156, 158 and 160 are being performed, the LAN controller, to which the incoming message frame was applied at block 152, by direct memory access directs the incoming frame into one or more data buffers in RAM 98, at block 168, the LAN controller having obtained the addresses of these data buffers from the buffer address list in the control RAM. That list was previously prepared by the processor, as described above. Thus, upon the bridge side receiving a frame, the LAN controller need not communicate with the processor to determine where the incoming frame should be stored. Minimizing the need for such communication serves to enhance the operating speed of the bridge. Upon completing storing the message frame in the frame RAM, the LAN controller writes in the control RAM, at block 170, status information indicating that a message frame was received as well as information descriptive of the frame (e.g., size of frame) and the addresses of the data buffers in which the received frame is stored.

Thus it is seen that the configuration of bridge 50 enables reception and storage of a frame, by the LAN controller, substantially simultaneously with a determination, by the processor, of whether or not the frame should be transmitted. In particular, this is made possible by locating the LAN controller on one local bus and the processor, with the address reader, on a separate local bus. The address reader obviates the need for the processor to directly access the received message frame and enables the processor to commence the filter frames routine before the LAN controller completes storing the frame in RAM 98. The ability of the LAN controller and processor to perform their respective operations substantially in parallel serves to minimize the time required for the bridge to disposition each received message frame.

Further, with the processor and LAN controller on separate local buses, there is no delay that would otherwise result from one of these devices waiting to access the bus in order to perform any of its requisite operations, while the other device is using the bus to perform its operations. The number of operating cycles for which the LAN controller requires access to its local bus in order to store or retrieve a message frame in RAM 98 is substantial. If the processor and LAN controller were to share the same bus, processor access to the bus would be very limited and, as a result, the availability of the processor, to perform its requisite functions, would be correspondingly limited. It has been determined that by locating the processor and LAN controller on separate buses, processor availability is approximately doubled.

Referring again to FIG. 4, at block 172, the LAN controller, having written the above-described information in the control RAM, generates a processor interrupt signal on the control interconnection to its associated processor. At block 174, the processor responds to the interrupt signal by executing a frame interrupt handler routine in which it reads the information in the control RAM with respect to the received frame. If at block 164, it was determined to transmit the frame, the receiving bridge side processor, at block 176, executes a pass frame across the bridge routine. In executing this routine, the processor has available to it the frame source and destination addresses, from block 160, as well as the frame descriptive information it read, in the control RAM, at block 174. At block 178, the processor prepares an interprocessor descriptor packet which includes the number of data buffers in which the message frame is stored, the addresses in RAM 98 of those data buffers and the number of bytes in the last data buffer storing the frame. The receiving bridge side processor writes the descriptor packet into RAM 120 and, at block 180, places a pointer on the transmit frame queue of the processor on the other bridge side, hereinafter called the transmitting bridge side. Then, at block 182, the receiving bridge side processor sends to the transmitting bridge side processor an interrupt signal on control connection 122, the content of the interrupt signal indicating that the latter processor should poll its transmit frame queue.

Referring now to FIG. 5 which illustrates operations on the transmitting bridge side, in response to the interrupt signal, the transmitting bridge side processor, at block 184, executes a construct transmit command routine. This routine commences, at block 186, with the processor polling its transmit frame queue and reading the interprocessor descriptor packet. Then, at block 188, the processor writes a transmit command into its associated control RAM, the transmit command including the addresses of the data buffers in which the message frame to be transmitted is stored. At block 190, the processor generates a controller interrupt signal on the control interconnection to its associated LAN controller. The LAN controller responds to the interrupt signal, executing the transmit command, at block 192, and, by direct memory access, directing the message frame from the data buffers in RAM 98 to the transmitting bridge side interface device. At block 194, the interface device transmits the message frame onto the LAN connected thereto. At block 196, the transmitting bridge side LAN controller writes in its control RAM the status information that the message frame was transmitted. At a later time, when the processor reads this status, it executes a free buffers routine, at block 198. In executing this routine, the processor returns the addresses of the buffers, used to store the transmitted message frame, back to the free buffer address queue in RAM 120.

Note that if the method disclosed in the above-referenced Ser. No. 892,601 application is practiced, the interprocessor descriptor packet also includes the source address of the message frame to be transmitted. Then, an additional operation, at block 200, following block 186, is performed by the transmitting bridge side processor, wherein that processor updates its source address table, if required, based on the source address of the message frame.

Referring again to FIG. 4, if the receiving bridge side processor determines the message frame is to be discarded at block 164, the processor, at block 202, executes a recover buffers routine. In executing this routine, the processor, at block 204, first removes the addresses of the buffers, in which the frame is stored, from the buffer address list in the control RAM. Then, at block 206 the processor returns the buffer addresses to the free buffer address queue in RAM 120.

In the transmission of a message frame through bridge 50, the frame is stored only once, in RAM 98. This single storage enhances the operating speed of the bridge and is made possible by the dual-port RAM 98 which is shared between and accessible by bridge sides 56 and 58. This obviates the need for storing a message frame twice in the process of transmitting it through the bridge: once, upon receiving the frame, in the receiving bridge side and then a second time upon transferring it for storage in the transmitting bridge side prior to its transmission.

In the operation of bridge 50 as described above, the information extracted by the bridge from the received message frame, in order to determine whether to transmit or discard it, is limited to the source and destination addresses. Thus, with reference to the ISO seven layer open system interconnection model, bridge 50 operates within the datalink layer of protocol. As a result, the bridge operation is, desirably, totally independent of the higher client protocol layers.

In the preferred embodiment of the present invention, the processor and LAN controller in bridge 50 are respectively implemented with the above-described Intel 80186 and 82586 chips. The 82586 chip requires a specific structure for the memory in the control RAM. The 80186 chip is programmed by the user to provide that memory structure. Details of this memory structure are provided in the Intel Microcommunications Handbook and Hindin references cited above. Additional changes are made to that structure to adapt those chips for use in the present invention.

Figure 6:
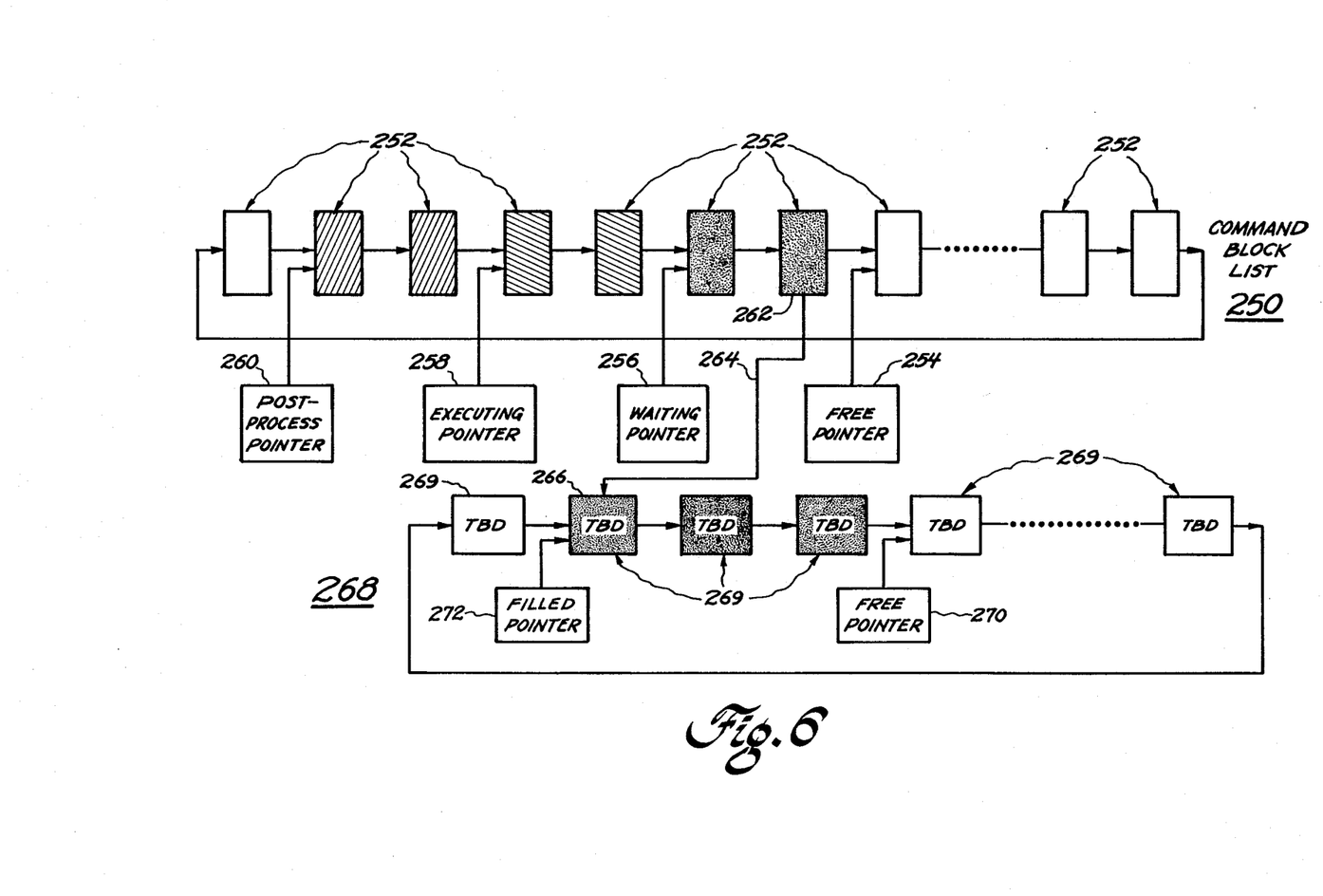
FIG. 6 is a diagram illustrating a memory structure used in a preferred embodiment of the present invention.

The area of each control RAM in which processor control commands and 82586 chips status messages are stored includes a first pointer into a list of commands, called the command block list (CBL), for execution by the 82586 chip and a second pointer into a receive frame area (RFA) of the control RAM. The CBL is a linked list in which each command block contains a command for the 82586 chip to execute and a link to the next command block in the CBL. In adapting the 82586 chip for use in the present invention, the CBL is closed onto itself to form a circular linked list. A command block list 250 is illustrated in FIG. 6 and consists of a plurality of command blocks 252 linked together. The processor maintains a free pointer 254, into list 250, to designate the start of the unused command blocks and a waiting pointer 256 to indicate the start of a list of commands constructed by the processor but not issued to the 82586 chip. An executing pointer 258 indicates the start of the list of commands being executed by the LAN controller. A post-processing pointer 260 points to the start of the list of commands that have been executed by the 82586 chip. One type of command that may be contained in a command block is the transmit command. As discussed above, this command is constructed by the processor in executing the construct transmit command routine.

A transmit command block 262 contains a transmit command including a transmit buffer descriptor (TBD) pointer 264, diagrammatically indicated by the arrow labeled 264 which points to a TBD 266 in a circular linked list 268 of TBDs 269 established by the processor. Each TBD associated with a particular transmit command includes the address of a buffer in RAM 98 containing a portion of the message frame to be transmitted. TBD 266 is the first TBD, in list 268, containing a portion of the particular frame to be transmitted. Each TBD also includes a pointer (not shown) to the next TBD in list 268. Additionally, the TBD that includes the address of the last buffer storing the frame to be transmitted includes a last TBD flag (not shown), designating this. As illustrated in FIG. 6, the processor maintains a free pointer 270 and a filled pointer 272 respectively designating the start of unused TBDs and the start of filled TBDs.

Thus, in executing the construct transmit command routine (FIG. 5) and writing the transmit command, the processor would, commencing at free pointer 270, enter into a series of TBDs the addresses of the data buffers containing the frame to be transmitted. Then, the processor would set the last TBD flag in the appropriate TBD and move free pointer 270 to the first unused TBD following those in which the buffer addresses were just stored. Additionally, in the CBL, pointer 264 would be set in the transmit command to reference the first TBD holding the data buffer addresses of the data buffers holding the frame to be transmitted.

Figure 7A:
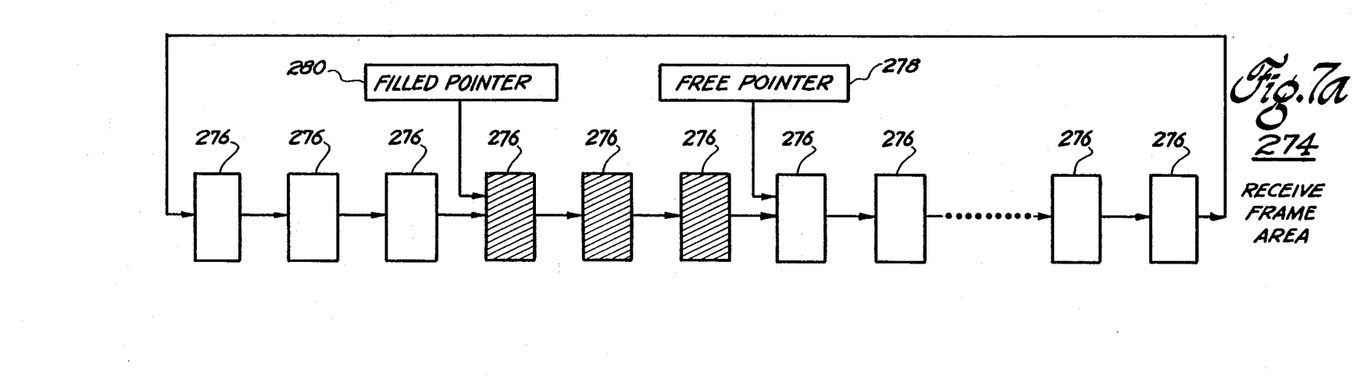
Figure 7B:
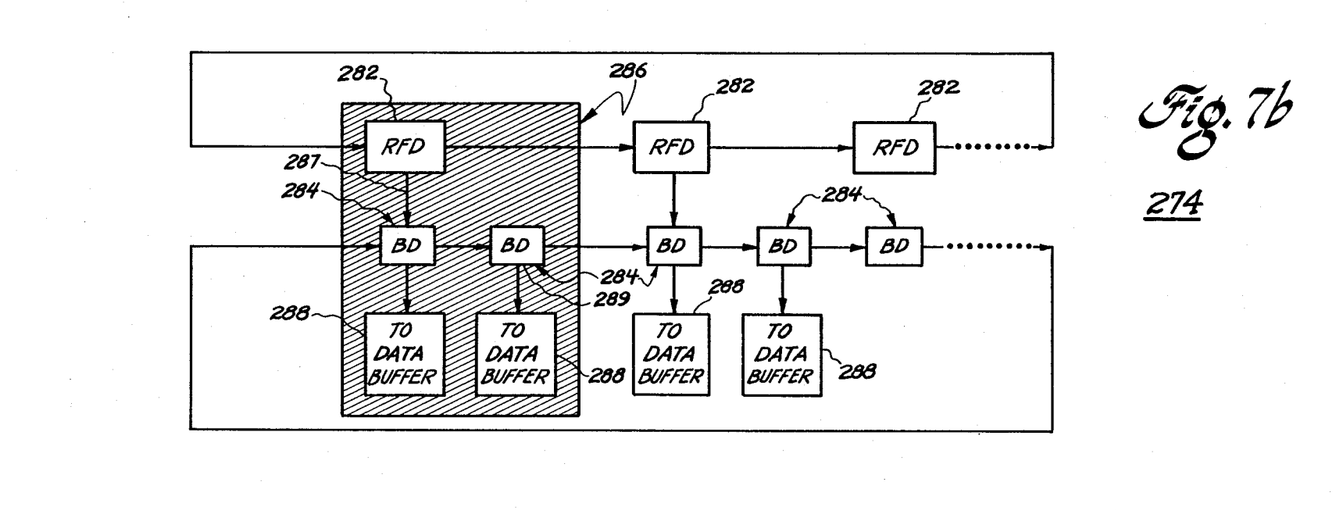

A receive frame area 274 in which the 82586 chip writes information descriptive of received message frames, is illustrated in FIG. 7a. Area 274 consists of a linked list of frame descriptors (FD) 276 which is closed onto itself to form a circular linked list in the practice of the present invention. A free pointer 278 and a filled pointer 280 are maintained by the processor and respectively designate the start of unused FDs and the start of filled FDs. Area 274 is illustrated in greater detail in FIG. 7b and includes a plurality of receive frame descriptors (RFD) 282, a plurality of buffer descriptors (BD) 284 and an exemplary FD 286 corresponding to a received frame. As seen in FIG. 7b, the linked list of FDs actually consists of two parallel circular linked lists respectively of RFDs 282 and BDs 284. These lists are initially set up by the processor which subsequently only moves pointers 278 and 280 to indicate the portion of the FD list which is filled. The linked list of BDs is the above-described buffer address list formed by each processor in its control RAM. The BDs in a portion of the linked list each contain the address in RAM 98 of a data buffer available for storing message frames. These BDs each have a "to data buffer" block 288 connected thereto by an arrow. The remaining BDs in the list do not include a buffer address. Each RFD is adapted to have written therein by the 82586 chip, information descriptive of a received message frame, the nature of this information being fully described in the Intel Microcommunications Handbook, Chapter 2 cited above. With respect to an FD that contains such information descriptive of a received message frame, such as FD 286, the 82586 chip writes a pointer, in the RFD of the FD, to the BD containing the address of the first data buffer storing the received frame. The pointer is diagrammatically indicated in FIG. 7b by an arrow 287. The BD containing the address of the last data buffer storing the received frame, for example BD 289 in FD 286, has a last BD flag (not shown) set by the 82586 chip. Referring also to FIG. 4, in the preferred embodiment of the present invention, the frame description referred to in block 170 is written by the 82586 chip into the RFD. The frame location in RAM 98 is described by the series of BDs, the first of which is pointed to by the RFD and the last of which has the last BD flag set. The processor reads this information at block 174 and uses it in executing the pass frame across routine (block 176) and recover buffers routine (block 202). With respect to the recover buffers routine, at block 204 the processor removes the addresses from the respective BDs of a filled FD after it is determined the corresponding message frame is to be discarded. Thus, subsequent to this operation these BDs do not include buffer addresses. The processor treats the BDs of transmitted frames in a similar fashion. Periodically, the processor takes free data buffer addresses from the free data buffer queue in LAN 120, as previously discussed, and writes them into the BDs to assure the LAN controller has sufficient buffers available for storing incoming message frames.

During bridge operation, both sides of bridge 50 receive message frames and the processors on both sides determine the transmissibility of the received frames. RAM 98 is sized to hold a sufficient number of received frames so that it is highly unlikely the RAM will overfill during bridge operation. Since the network interface does not simultaneously transmit and receive, the LAN controller on each bridge side gives priority to receiving message frames. Then, when no frames are being received, the controller executes accumulated transmission commands.

The bridge disclosed herein includes substantially identical devices in the two bridge sides. Such identical devices limit the application of the bridge to the interconnection of two LANs each having substantially the same physical and datalink layers of the ISO model. However, the invention is not so limited. The set of components used on one bridge side may differ from those used on the other bridge side. In such a case, the components on either bridge side may be selected to enable communication with the particular type of LAN (i.e., with respect to its physical and datalink layers) connected to that bridge side and differing from the type of LAN to which the other bridge side is connected. In this manner, the bridge may be applied to interconnect two LANs that differ in this respect.

The bridge of the present invention may be practiced with devices other than the Intel devices disclosed herein. For example, the above-cited Hindin reference describes a chip set, manufactured by American Micro Devices, for linking to local area networks, with which the present invention may be practiced.

The address reader disclosed herein reads and stores the source and destination addresses of the incoming message frame. It is further disclosed herein that a source address table is maintained on each bridge side. The invention is not so limited. Each bridge side could instead maintain a destination address table including devices connected to the communication network associated with the other bridge side. Then, it would only be necessary for the address reader to read and store the incoming frame destination address. The processor on the receiving bridge side would then determine frame transmissibility simply by looking up the destination address in the table and if the address is found or not found, determining the frame to respectively be transmissible or not transmissible. Note that where only a destination address table is maintained on each bridge side, means for maintaining current the content of those address tables would have to be provided. Generally, it is only necessary that the address reader be adapted to read only the frame address information required by the frame transmissibility determination method being used.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. Apparatus for establishing a bridge between a pair of communication networks, each of said networks being adapted to carry bit-serial message frames between devices coupled thereto, each said message frame having a leading portion including an address portion, said apparatus comprising:
   a pair of bridge sides each coupled to a respective one of said networks for transmitting and receiving message frames to and from its associated communication network;
   memory means, accessible by said bridge sides, for retrievably storing message frames;
   each of said bridge sides including:
      interface means for receiving an incoming message frame from or transmitting an outgoing message frame to its associated communication network;
      processor means for determining whether said incoming message frame is transmissible from one of said networks to the other, said processor means providing a first signal upon determining said incoming message frame is transmissible;
      said processor means providing a second signal effective to initiate the transmission of said outgoing message frame;
      controller means for directing said incoming message frame from said interface means to said memory means, said controller means responsive to said second signal to direct said outgoing message frame from said memory means to said interface means;
      means for reading and storing the address portion of said incoming message frame concurrently with said controller means directing said incoming message frame to said memory means, the stored address portion being immediately accessible by said processor means for determining the transmissibility of said incoming message frame;
   said pair of bridge sides coupled together such that each of said bridge sides can function as either a receiving bridge side for receiving said incoming message frame or a transmitting bridge side for transmitting said outgoing message frame; and
   upon said processor means on said receiving bridge side providing said first signal, said processor means on said transmitting bridge side responsively providing said second signal to said controller means on said transmitting bridge side;
   whereby said receiving bridge side address reading means reads and stores said address portion, said receiving bridge side processor means having immediate access to said address portion to determine therefrom the transmissibility of said incoming mesage frame concurrently with said controller means directing said incoming message frame to said memory means.

2. The bridge apparatus of claim 1 wherein said memory means is a first memory means, each of said bridge sides further including:
   second memory means for storing signals provided by said processor means and said controller means for retrieval by said controller means and said processor means, respectively.

3. The bridge apparatus of claim 2 and further including third memory means accessible by both said bridge sides for storing signals provided by the respective processor means on said receiving bridge side and said transmitting bridge side.

4. The bridge apparatus of claim 3 wherein each of said bridge sides maintains a table of source addresses, said table including addresses of devices coupled to the communication network associated with that bridge side, each of said bridge sides further including:
  fourth memory means for storing said source address table, said fourth memory means being accessible by the processor means on the same bridge side.

5. The bridge apparatus of claim 3, each of said bridge sides further including first and second local buses, said processor means and said controller means on each said bridge side being respectively coupled to said first and second local buses;
  said second memory means on each said bridge side coupled between said first and second local buses; and
  said address reading means coupled to said first local bus on each said bridge side.

6. The bridge apparatus of claim 5 wherein each of said bridge sides maintains a table of source addresses, said table including addresses of devices coupled to the communication network associated with the bridge side, each of said bridge sides further including:
  fourth memory means for storing said source address table, said fourth memory means being coupled to said first local bus and accessible by the processor means on the same bridge side;
  said first memory means coupled between the respective second local buses of said bridge sides; and
  said third memory means coupled between the respective first local buses of said bridge sides.

7. The bridge apparatus of claim 2 wherein each of said bridge sides maintains a table of source addresses, said table including addresses of devices coupled to the communication network associated with that bridge side, each of said bridge sides further including:
  third memory means for storing said source address table, said third memory means being accessible by the processor means on the same bridge side.

8. The bridge apparatus of claim 7, each of said bridge sides further including first and second local buses, said processor means and said controller means on each said bridge side being respectively coupled to said first and second local buses;
  said second memory means on each said bridge side coupled between said first and second local buses;
  said third memory means and said address reading means coupled to said first local bus on each said bridge side; and
  said first memory means coupled between the respective second local buses of said bridge sides.

9. The bridge apparatus of claim 2, each of said bridge sides further including first and second local buses, said processor means and said controller means on each said bridge side being respectively coupled to said first and second local buses;
  said first memory means coupled between the respective second local buses of said bridge sides; and
  said second memory means coupled between said first and second local buses on each said bridge side.

10. The bridge apparatus of claim 1 wherein said memory means is a first memory means, said bridge apparatus further including:
  second memory means accessible by both said bridge sides for storing signals provided by the processor means on both said receiving bridge side and said transmitting bridge side.

11. The bridge apparatus of claim 10 wherein each of said bridge sides maintains a table of source addresses, said table including addresses of devices coupled to the communication network associated with that bridge side, each of said bridge sides further including:
  third memory means for storing said source address table, said third memory means being accessible by the processor means on the same bridge side.

12. The bridge apparatus of claim 11, each of said bridge sides further including first and second local buses, said processor means and said controller means on each said bridge side being respectively coupled to said first and second local buses;
  said third memory means and said address reading means coupled to said first local bus on each said bridge side;
  said first memory means coupled between the respective second local buses of said bridge sides; and
  said second memory means coupled between the respective first local buses of said bridge sides.

13. The bridge apparatus of claim 10, each of said bridge sides further including first and second local buses, said processor means and said controller means on each said bridge side being respectively coupled to said first and second local buses;
  said first memory means coupled between the respective second local buses of said bridge sides; and
  said second memory means coupled between the respective first local buses of said bridge sides.

14. The bridge apparatus of claim 1 wherein said memory means is a first memory means;
  each of said bridge sides maintaining a table of source addresses, said table including addresses of devices coupled to the communication network associated with that bridge side; and
  second memory means included in each said bridge side for storing said source address table, said second memory means being accessible by the processor means on the same bridge side.

15. The bridge apparatus of claim 14, each of said bridge sides further including first and second local buses, said processor means and said controller means on each said bridge side being respectively coupled to said first and second local buses;
  said second memory means and said address reading means coupled to said first local bus on each said bridge side; and
  said first memory means coupled between the respective second local buses on said bridge sides.

16. The bridge apparatus of claim 1, each of said bridge sides further including first and second local buses, said processor means and said controller means on each said bridge side being respectively coupled to said first and second local buses;
  said address reading means coupled to said first local bus on each said bridge side; and
  said memory means coupled between the respective second local buses of said bridge sides.

17. A method for bridging between a pair of communication networks, each of said networks being adapted to carry bit-serial message frames between devices coupled thereto, each of said message frames including an address portion, said bridge comprising a pair of bridge sides coupled together such that each of said bridge sides can function as either a receiving bridge side or a transmitting bridge side respectively for either receiving an incoming message frame from or transmitting an outgoing message frame to its associated network, said pair of bridge sides sharing memory means for storing a message frame, said method comprising the steps of:

receiving said incoming message frame on said receiving bridge side from the network associated therewith;

directing said incoming message frame to said memory means for storage therein;

reading said address portion of said incoming frame concurrently with said directing step;

determining on said receiving bridge side whether said incoming message frame is transmissible to the network associated with said transmitting bridge side, said determining step being performed using said address portion acquired in said reading step;

discarding said incoming message frame if it is determined to be not transmissible;

sending a signal from said receiving bridge side to said transmitting bridge side if said incoming message frame is determined to be transmissible; and directing the transmissible incoming message frame, as said outgoing message frame, from said memory means to the communication network associated with said transmitting bridge side.

18. The method of claim 17 wherein said signal is a first signal, said method comprising the additional step of:

providing a second signal on said transmitting bridge side after said first signal is received thereby, said second signal being effective to initiate said transmissible frame directing step.

19. The method of claim 17 wherein said memory means is a first memory means, each said bridge side further including second memory means for storing a source address table including addresses of devices coupled to the communication network associated with the respective bridge side, said method comprising the additional step, following said reading step, of:

storing said address portion in said second memory means; and said determining step further including:

determining if said address portion is included in said source address table on said receiving bridge side.

20. The method of claim 17 wherein said memory means is a first memory means, each of said bridge sides including processor means for determining the transmissibility of said incoming message frame, the processor means on said receiving bridge side providing said signal, said bridge including second memory means, shared between the processor means on the respective bridge sides, for retrievably storing signals therein, said method comprising the additional step of:

storing said signal provided by said receiving bridge side processor means in said second memory means; and said sending step further including the processor means on said transmitting bridge side retrieving said signal from said second memory means.

21. The method of claim 20 wherein said signal is a first signal, said method including the additional step, following said signal sending step, of:

providing a second signal from said processor means on said transmitting bridge side in response to said first signal, said second signal being effective to initiate said transmissible frame directing step.

22. The method of claim 21 wherein each said bridge side further includes third memory means for storing a source address table including addresses of devices coupled to the communication network associated with the respective bridge side, said method comprising the additional step, following said reading step, of:

storing said address portion in said third memory means; and said determining step further including:

determining if said address portion is included in said source address table on said receiving bridge side.

23. The method of claim 21 wherein each of said bridge sides further includes network interface means for transmitting the outgoing message frame to the communication network associated with the respective bridge side and controller means for directing the outgoing message frame from said first memory means to said interface means, each said bridge side additionally including third memory means, shared between the processor means and controller means on each said bridge side, for retrievably storing signals therein, said transmissible frame directing step further including the steps of:

directing said outgoing message frame from said first memory means to said network interface means on said transmitting bridge side; and transmitting said outgoing message frame from said transmitting bridge side network interface means to the associated network;

said method including the additional step, following said second signal providing step, of:

storing said second signal in said third memory means on said transmitting bridge side for retrieval by said controller means on the last-recited bridge side.

24. The method of claim 23 wherein each said bridge side further includes fourth memory means for storing a source address table including addresses of devices coupled to the communication network associated with the respective bridge side, said method comprising the additional step, following said reading step, of:

storing said address portion in said fourth memory means; and said determining step further including:

determining if said address portion is included in said source address table on said receiving bridge side.

* * * * *